US009727879B2

(12) United States Patent
Suomela et al.

(10) Patent No.: US 9,727,879 B2
(45) Date of Patent: Aug. 8, 2017

(54) METHOD AND APPARATUS FOR PROVIDING TAG-BASED CONTENT INSTALLATION

(75) Inventors: Riku Suomela, Espoo (FI); Saku A. Sulander, Espoo (FI); Ari Matti Tulla, San Francisco, CA (US); Timo Toivanen, Helsinki (FI); Mark Ollila, Kirkkonummi (FI); Jari Tapio Ijäs, Espoo (FI); Rit Mishra, Helsinki (FI); Jonatan Hedberg, Helsinki (FI)

(73) Assignee: Nokia Technologies Oy, Espoo (FI)

(*) Notice: Subject to any disclaimer, the term of this patent is extended or adjusted under 35 U.S.C. 154(b) by 205 days.

(21) Appl. No.: 13/092,729

(22) Filed: Apr. 22, 2011

(65) Prior Publication Data

US 2012/0253894 A1    Oct. 4, 2012

Related U.S. Application Data

(60) Provisional application No. 61/469,404, filed on Mar. 30, 2011.

(51) Int. Cl.
*G06F 9/445*    (2006.01)
*G06Q 30/02*    (2012.01)

(52) U.S. Cl.
CPC ..................... *G06Q 30/02* (2013.01)

(58) Field of Classification Search
CPC ............................................. G06F 8/60–8/64
See application file for complete search history.

(56) References Cited

U.S. PATENT DOCUMENTS

| | | | | |
|---|---|---|---|---|
| 4,477,881 A * | 10/1984 | Kobayashi et al. | ........... | 709/218 |
| 5,367,686 A * | 11/1994 | Fisher | ....................... | G06F 8/61 |
| | | | | 713/100 |
| 5,829,032 A * | 10/1998 | Komuro et al. | ............... | 711/141 |
| 6,172,596 B1 * | 1/2001 | Cesar et al. | ................ | 340/10.41 |
| 6,240,456 B1 * | 5/2001 | Teng et al. | ..................... | 709/230 |

(Continued)

FOREIGN PATENT DOCUMENTS

| | | | | |
|---|---|---|---|---|
| WO | WO 01/55922 A2 | 8/2001 | | |
| WO | WO 2008060242 A1 * | 5/2008 | ............. | G06F 21/00 |

(Continued)

OTHER PUBLICATIONS

Jantunen et al., Agent/Space-Based Computing and RF Memory Tag Interaction, published 2009, International Workshop o RFID Technology—IWRT, pp. 1-10.*

(Continued)

*Primary Examiner* — Tuan Q. Dam
*Assistant Examiner* — Zheng Wei
(74) *Attorney, Agent, or Firm* — Ditthavong & Steiner, P.C.

(57) ABSTRACT

An approach is provided for providing tag-based content installation. The content manager causes, at least in part, reading of tag information from one or more memory tags, the one or more memory tags compliant with at least one protocol for automated content installation. Next, the content manager processes and/or facilitates a processing of the tag information to determine at least one link to one or more content items. Then, the content manager causes, at least in part, retrieval, installation, or a combination thereof of the one or more content items according to the at least one protocol.

20 Claims, 10 Drawing Sheets

(56) References Cited

U.S. PATENT DOCUMENTS

| | | | | |
|---|---|---|---|---|
| 6,874,025 | B2* | 3/2005 | Hoogenboom | G06F 9/4443 709/203 |
| 7,093,078 | B2* | 8/2006 | Kondo | 711/141 |
| 7,302,414 | B2* | 11/2007 | Cox | G07B 17/00024 705/401 |
| 7,672,662 | B2* | 3/2010 | Hamberg | 455/411 |
| 7,753,281 | B2* | 7/2010 | Li et al. | 235/492 |
| 7,853,719 | B1* | 12/2010 | Cao et al. | 709/245 |
| 8,401,681 | B2* | 3/2013 | Rosenblatt | G06F 17/30058 381/123 |
| 8,527,987 | B2* | 9/2013 | Johansson | G06F 8/61 455/41.1 |
| 8,620,215 | B2* | 12/2013 | Abel | G06Q 30/0207 235/382 |
| 9,075,676 | B2* | 7/2015 | Yamaguchi | G06F 8/60 |
| RE46,108 | E* | 8/2016 | Ohnishi | |
| 2001/0003839 | A1* | 6/2001 | Kondo | 711/144 |
| 2002/0082910 | A1* | 6/2002 | Kontogouris | G06Q 30/02 705/14.19 |
| 2002/0111172 | A1* | 8/2002 | DeWolf et al. | 455/456 |
| 2002/0138452 | A1* | 9/2002 | Cox | G07B 17/00024 705/401 |
| 2002/0140966 | A1* | 10/2002 | Meade et al. | 358/1.15 |
| 2003/0069007 | A1* | 4/2003 | Rajaram et al. | 455/419 |
| 2004/0030788 | A1* | 2/2004 | Cimo | H04L 63/0227 709/229 |
| 2005/0032511 | A1* | 2/2005 | Malone et al. | 455/420 |
| 2005/0097595 | A1* | 5/2005 | Lipsanen et al. | 725/25 |
| 2005/0267945 | A1* | 12/2005 | Cohen | G06F 21/10 709/215 |
| 2006/0043201 | A1* | 3/2006 | Vesikivi et al. | 235/492 |
| 2006/0071778 | A1* | 4/2006 | Vesikivi | G06F 17/30876 340/539.1 |
| 2006/0151592 | A1 | 7/2006 | Poor | |
| 2006/0187080 | A1* | 8/2006 | Slatter | 340/825.22 |
| 2006/0259949 | A1* | 11/2006 | Schaefer et al. | 726/1 |
| 2007/0045412 | A1* | 3/2007 | Wu | G06Q 20/045 235/383 |
| 2007/0067489 | A1* | 3/2007 | Blank et al. | 709/238 |
| 2007/0239724 | A1 | 10/2007 | Ramer et al. | |
| 2008/0153510 | A1* | 6/2008 | Sulander et al. | 455/456.3 |
| 2009/0055270 | A1* | 2/2009 | Magdon-Ismail et al. | 705/14 |
| 2009/0058647 | A1 | 3/2009 | Dennard et al. | |
| 2009/0077674 | A1 | 3/2009 | Shin et al. | |
| 2009/0150889 | A1* | 6/2009 | Yamaguchi | G06F 8/60 718/102 |
| 2009/0184802 | A1* | 7/2009 | Park | 340/10.1 |
| 2010/0070966 | A1* | 3/2010 | Perng | G06F 8/60 717/173 |
| 2010/0174599 | A1* | 7/2010 | Rosenblatt et al. | 705/14.37 |
| 2010/0274568 | A1* | 10/2010 | Huhtala et al. | 705/1.1 |
| 2010/0274617 | A1* | 10/2010 | Suomela et al. | 705/9 |
| 2010/0275215 | A1* | 10/2010 | Suomela et al. | 718/106 |
| 2010/0291896 | A1* | 11/2010 | Corda | G06Q 20/3278 455/410 |
| 2010/0306318 | A1* | 12/2010 | Fitzpatrick et al. | 709/206 |
| 2010/0318426 | A1* | 12/2010 | Grant et al. | 705/14.66 |
| 2011/0010704 | A1 | 1/2011 | Jeon et al. | |
| 2011/0040757 | A1* | 2/2011 | Kossi et al. | 707/737 |
| 2011/0053504 | A1* | 3/2011 | Corda | G06F 21/35 455/41.1 |
| 2011/0072425 | A1* | 3/2011 | Lemonnier | G06Q 20/32 717/178 |
| 2011/0143661 | A1* | 6/2011 | Hartwig et al. | 455/41.1 |
| 2011/0165859 | A1* | 7/2011 | Wengrovitz | H04M 1/7253 455/411 |
| 2011/0185607 | A1* | 8/2011 | Forster | G09F 13/04 40/452 |
| 2011/0264527 | A1* | 10/2011 | Fitzpatrick et al. | 705/14.55 |
| 2011/0276961 | A1* | 11/2011 | Johansson et al. | 717/178 |
| 2011/0292445 | A1* | 12/2011 | Kato | G06F 3/1222 358/1.15 |
| 2012/0021683 | A1* | 1/2012 | Ma | G06Q 20/3278 455/41.1 |
| 2012/0044059 | A1* | 2/2012 | Saros | H04W 4/02 340/10.5 |
| 2012/0068828 | A1* | 3/2012 | Saros | G06K 7/0008 340/10.1 |
| 2012/0115458 | A1* | 5/2012 | Ito | G06Q 30/02 455/419 |
| 2012/0171952 | A1* | 7/2012 | Ohira | H04M 1/72525 455/41.1 |
| 2012/0209724 | A1* | 8/2012 | Wayne | 705/14.72 |
| 2012/0220282 | A1* | 8/2012 | Kwon | H04B 5/0031 455/418 |

FOREIGN PATENT DOCUMENTS

| | | | |
|---|---|---|---|
| WO | WO 2009030023 A1 * | 3/2009 | G06F 11/00 |
| WO | WO 2009/079407 A2 | 6/2009 | |
| WO | WO 2010/077194 A1 | 7/2010 | |
| WO | WO 2010/097509 A1 | 9/2010 | |
| WO | WO 2010/133753 A1 | 11/2010 | |

OTHER PUBLICATIONS

Jantunen et al., Integration and Uses of RF Memory Tags, published 2009, Proceeding ETFA'09 Proceedings of the 14th IEEE internaltional conference on Emerging technologies & factory automation, pp. 1-8.*

Jantunen et al., System Architecture for Mobile-phone-readable RF Memory Tags, published 2010, UBICOMM 2010, pp. 310-316.*

HotComm FAQ, F-Secure, Mar. 15, 2010, <http://hotcomm.com/FAQ/FAQ_fsecure.asp>.

International earch Report for PCT/Fi2012/050275 dated Aug. 24, 2012, pp. 1-10.

Written Opinion Opinion for PCT/FI2012/050275 dated Aug. 24, 2012, pp. 1-9.

* cited by examiner

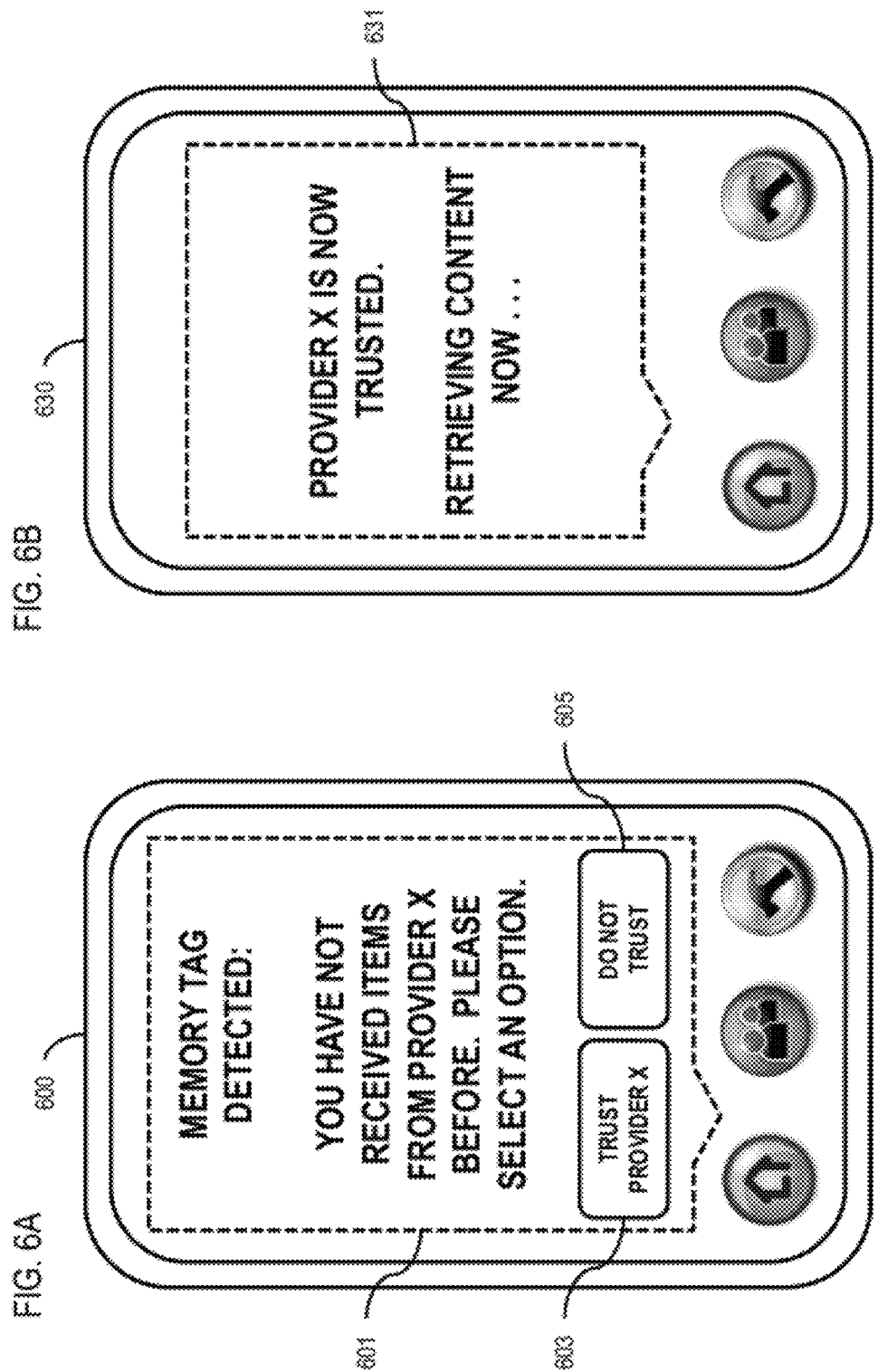

METHOD AND APPARATUS FOR PROVIDING TAG-BASED CONTENT INSTALLATION

RELATED APPLICATIONS

This application claims the benefit of the earlier filing date under 35 U.S.C. §119(e) of U.S. Provisional Application Ser. No. 61/469,404 filed on Mar. 30, 2011, entitled "Method and Apparatus for Providing Tag-Based Content Installation," the entirety of which is incorporated herein by reference.

BACKGROUND

Service providers and device manufacturers (e.g., wireless, cellular, etc.) are continually challenged to deliver value and convenience to consumers by, for example, providing compelling network services. One area of interest has been the development of user-friendly mobile devices and services for such devices. For example, mobile devices are now equipped with touch capabilities, zoom-in/zoom-out functions, Near Field Communication (NFC) or other short-range wireless technologies, etc. In addition, applications, websites, and other content items are being developed specifically for mobile devices, and services also exist to provide mobile device users with easier access to these content items. Nonetheless, content retrieval and/or installation still require numerous user actions, such as having to enter web addresses into mobile devices to access websites, scrolling on the website to find buttons/icons to select, tapping buttons/icons to obtain content, etc. As such, content retrieval and/or installation can still be made to be more user-friendly.

SOME EXAMPLE EMBODIMENTS

Therefore, there is a need for an approach for providing tag-based content installation.

According to one embodiment, a method comprises causing, at least in part, reading of tag information from one or more memory tags, the one or more memory tags compliant with at least one protocol for automated content installation. The method also comprises processing and/or facilitating a processing of the tag information to determine at least one link to one or more content items. The method further comprises causing, at least in part, retrieval, installation, or a combination thereof of the one or more content items according to the at least one protocol.

According to another embodiment, an apparatus comprises at least one processor, and at least one memory including computer program code, the at least one memory and the computer program code configured to, with the at least one processor, cause, at least in part, the apparatus to read tag information from one or more memory tags, the one or more memory tags compliant with at least one protocol for automated content installation. The apparatus is also caused to process and/or facilitate a processing of the tag information to determine at least one link to one or more content items. The apparatus is further caused, at least in part, to retrieve and/or install the one or more content items according to the at least one protocol.

According to another embodiment, a computer-readable storage medium carries one or more sequences of one or more instructions which, when executed by one or more processors, cause, at least in part, an apparatus to read tag information from one or more memory tags, the one or more memory tags compliant with at least one protocol for automated content installation. The apparatus is also caused to process and/or facilitate a processing of the tag information to determine at least one link to one or more content items. The apparatus is further caused, at least in part, to retrieve and/or install the one or more content items according to the at least one protocol.

According to another embodiment, an apparatus comprises means for causing, at least in part, reading of tag information from one or more memory tags, the one or more memory tags compliant with at least one protocol for automated content installation. The apparatus also comprises means for processing and/or facilitating a processing of the tag information to determine at least one link to one or more content items. The apparatus further comprises means for causing, at least in part, retrieval, installation, or a combination thereof of the one or more content items according to the at least one protocol.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-11, 21-31, and 48-50.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6A and 6B are diagrams of user interfaces utilized in the processes of FIG. 3, according to various embodiments;

DESCRIPTION OF SOME EMBODIMENTS

Examples of a method, apparatus, and computer program for providing tag-based content installation are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to mobile devices, it is contemplated that the approach described herein may be used with any type of device, such as desktops, notebooks, netbook, tablets, televisions, automobiles, appliances, etc.

Figure 1:
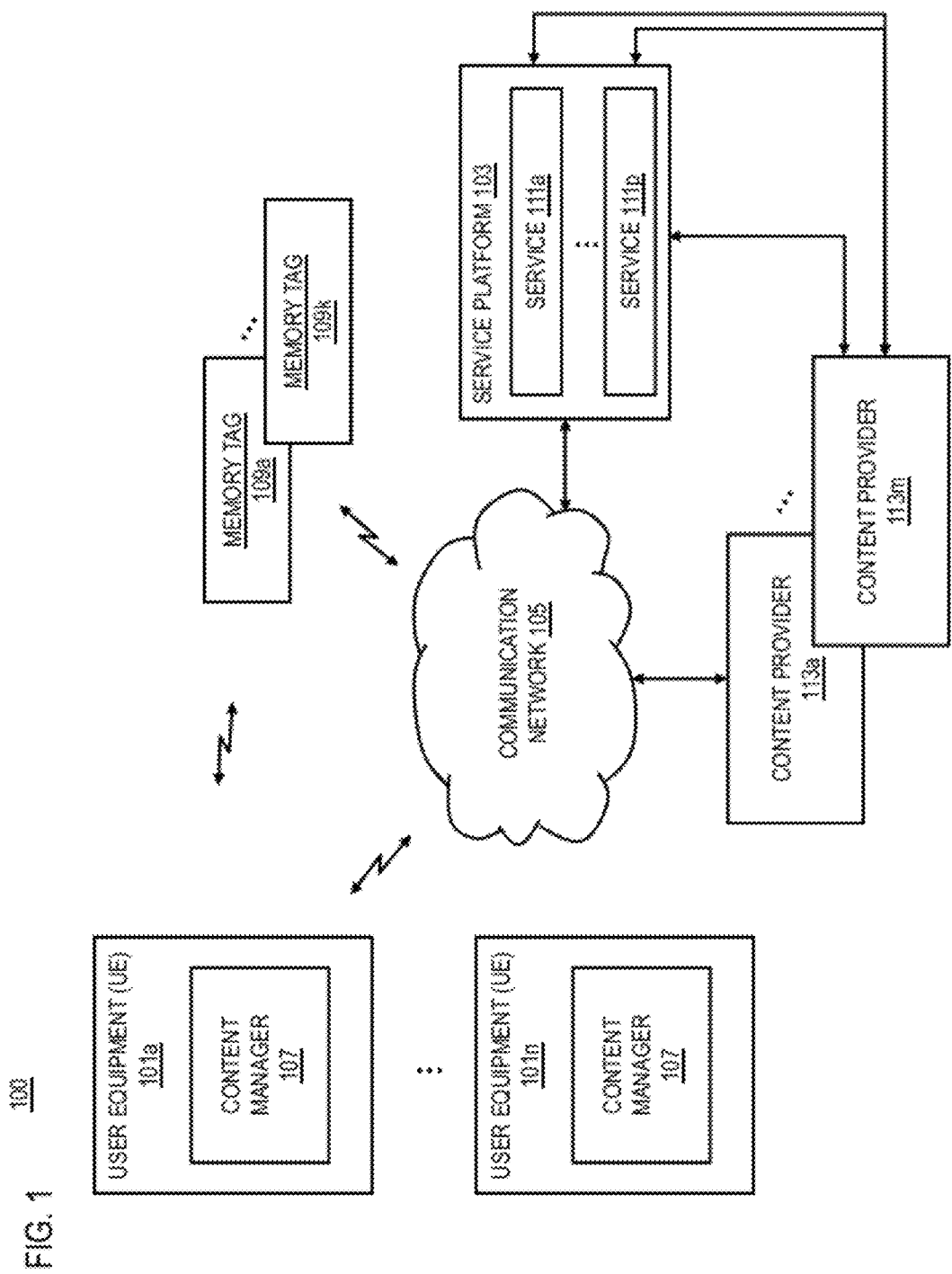
FIG. 1 is a diagram of a system capable of providing tag-based content installation, according to one embodiment.

FIG. 1 is a diagram of a system capable of providing tag-based content installation, according to one embodiment. As discussed, recent technological advances and developments have made mobile devices more user-friendly. For example, many mobile devices are now equipped with touch capabilities, zoom-in/zoom-out functions, Near Field Communication (NFC) or other short-range wireless technologies, etc. Moreover, applications, websites, and other content items are developed specifically for mobile devices, and services also exist to provide mobile device users with easier access to these content items. Such services include the Uniform Resource Locator (URL) shortening services that provide short aliases for redirection of long URLs to mitigate the cumbersome task of typing web addresses into a mobile device. Other such services include content enhancement services which enhance the content for mobile viewing, for instance, when accessed via an associated short alias. However, the requirement of entering the shorter web address (e.g., the short alias) into a mobile device may still be a cumbersome task for the user. Further, the requirements of other tasks associated with obtaining content in addition to the requirement of entering the web address may cause the user to avoid obtaining content altogether. In one scenario, for instance, a user may notice an advertisement for a book as the user walks past a bookstore. The advertisement may contain a URL for a website that would allow the user to download a free sample chapter of the book or to buy an electronic version of the book (e.g., e-book) for a discounted rate. However, the tasks associated with retrieving the content, such as entering the URL of the website into a mobile device, scrolling to find the downloadable content, and making selections to download the sample chapter or to buy the e-book, may be enough to deter the user from enjoying the incentives offered by the advertisement.

To address this problem, a system 100 of FIG. 1 introduces the capability to retrieve and/or install a content item by utilizing tag information from a memory tag. Specifically, the system 100 may utilize the tag information to determine a link (e.g., URL, Uniform Resource Identifier (URI), etc.) to the content item and automatically retrieve and/or install the content item, for instance, on a user device. By way of example, the system 100 may detect and utilize memory tags that are compliant with an automated content installation protocol. In doing so, tag information from a compliant memory tag may be processed to determine a link to a content item to be used in the retrieval and/or installation of the content item pursuant to the automated content installation protocol. The content item may, for instance, be other tag information located in the memory tag, information in a device, an online content store, a section within the online content store, an item within the online content store, an application within the online content store, an item within the application, information regarding a user, information associated with one or more physical objects (e.g., coupon for a free cup of coffee), an item in a content storage (e.g., content or applications stored in a network storage device), etc. Moreover, the retrieval and/or installation of the content item may be contingent or based on a number of criteria associated with the content item, the retrieval of the content item, the installation of the content item, etc. The criteria may, for instance, include a cost criterion (e.g. price associated with downloading the content item), a resource usage criterion (e.g., bandwidth, storage, processing requirements, etc.), or any other criterion.

In one use case, a user of a mobile device at a local video store may wish to rent a movie. As such, the user may place the mobile device near or against a memory tag associated with the desired movie. Upon detection of the memory tag (e.g., using NFC technology), and without any further user actions, the mobile device may check the tag information for a record indicating that the memory tag is compliant with an automated content installation protocol. After determining that such a record exists, the mobile device may continue to process the tag information for a link to the movie. The mobile device may thereafter utilize the link to retrieve and/or install the movie. For example, the tag information may reveal an Internet Protocol (IP) address associated with the movie, which may be used to download the movie to the mobile device.

In another scenario, the user may be visiting the local video store for the first time. Thus, when the user places the mobile device near or against the memory tag to rent a movie, the mobile device may recognize that the movie is associated with a provider (e.g., content provider, service provider, etc.) that the user has not previously interacted with, for instance, by reading the tag information from the memory tag. As such, the mobile device may present a prompt to the user to request the user's approval to rent the movie from the provider. In this example, the user may decide to deny the request and forego the movie rental (e.g., the user does not prefer renting from the particular provider, the user does not trust the particular provider, etc.). However, the user may also decide to approve the request. In that case, the mobile device may, for instance, download the movie to the mobile device without any further interaction from the user.

In a further scenario, the price of movie rentals may vary within the local video store (e.g., prices may vary with new releases, classics, etc.). As with previous examples, the user may place the mobile device near or against a memory tag associated with a movie that the user wishes to rent. In this scenario, the retrieval and/or installation of the movie rental may also be contingent or based on one or more criteria associated with the desired movie, the rental of the desired movie, etc. As an example, the rental of a movie may be based on a predetermined price threshold (e.g., defined by default, by the user, etc.). If, for instance, the price associated with the movie rental is 10 units or less, the placement of the mobile device near or against the associated memory tag may automatically initiate a download of the movie. However, if the price is more than 10 units, the placement of the mobile device near or against the associated memory tag may generate a prompt to be presented to the user requesting approval to accept the price of the movie rental before the movie is downloaded. As another example, the automated retrieval process may be based on the amount of memory required to store a particular movie. The mobile device may, for instance, not be able to support a movie download due to the movie's file size and the current lack of available storage space on the mobile device. Accordingly, the user may be prompted to remove other files (e.g., old temporary files, inactive files, etc.) before the movie rental is further processed.

In certain embodiments, users may be rewarded for sharing content items by providing other users with the content items, links to the content items, etc. In such a system, content item sharing may be initiated in a number of ways. As an example, the user may place the user's mobile device near or against another user's mobile device. For the purpose of this example, both the user's mobile device and the other user's mobile device may utilize NFC or other short-range technologies to detect and communicate with each other. In this way, the user's mobile device may automatically detect the other user's mobile device and immediately share the most recently activated content item (e.g., application, media content, etc., currently selected by the user). As another example, the user may instead have the option to select the content item to be shared as well as the option to select the device (e.g., from a list of detected devices) to share the content item with. Once sharing of the content item has been confirmed (e.g., shared content item has been retrieved and/or installed at the other device), the user may be provided with a reward item. Reward items may, for instance, include discount information and/or payment credits for an item in an online content store, an item in a section within the online content store, an application within the online content store, an item within the application, a physical object, an item in a content storage (e.g., content or applications stored in a network storage device), etc. Further, the reward item may be provided according to a reward setting (e.g., defined by a provider of the content item, the user, etc.) associated with the shared content item. It is noted that a reward system for sharing provides users with an incentive to distribute content to other users and to build a social network. It is further noted that the reward system may be extend to users for either sharing or accepting shared content. In this way, users may be provided with an incentive to accept shared content from other users and the growth of a social network for sharing may also be encouraged.

In certain other embodiments, the determination of whether a user is rewarded for sharing a content item is based on whether the retrieval and/or installation of the shared content item by the other device is an initial retrieval and/or installation. In one scenario, the retrieval and/or installation of the shared content item by the other device may not be determined to be an initial retrieval and/or installation where the user of the other device has previously retrieved the shared content item. In another scenario, the retrieval and/or installation of the shared content item by the other device may also not be determined to be an initial retrieval and/or installation where the shared content item was previously installed on the other device.

In particular embodiments, the retrieval and/or installation of a content item may be based on whether security information associated with the tag information, the content item, the retrieval of the content item, the installation of the content item, etc., may be validated. In this way, users and their mobile devices are provided with safety measures against malicious links and data. By way of example, installation of an application on a mobile device may be prevented from occurring until a security signature associated with the application is verified as a trusted signature.

More specifically, the system 100 may cause, at least in part, reading of tag information from one or more memory tags, wherein the one or more memory tags are compliant with at least one protocol for automated content installation. The system 100 may then process and/or facilitate a processing of the tag information to determine at least one link to one or more content items. As discussed, the one or more content items may include other tag information in the one or more memory tags, information in a device, an online content store, a section within the online content store, an item within the online content store, an application within the online content store, an item within the application, information regarding a user, information associated with one or more physical objects (e.g., coupon for a free cup of coffee), etc. The system 100 may further cause, at least in part, retrieval and/or installation of the one or more content items according to the at least one protocol. As provided, the retrieval and/or installation of the one or more content items may be contingent or based on one or more criteria associated with the one or more content items, the retrieval of the one or more content items, the installation of the one or more content items, etc. The one or more criteria may, for instance, include a cost criterion, a resource usage criterion, or any other criterion.

As shown in FIG. 1, the system 100 comprises a user equipment (UE) 101 or multiple UEs 101 (or UEs 101a-101n) having connectivity to a service platform 103 via a communication network 105. The UE 101 may include or have access to a content manager 107 to enable to the UE 101 to interact with one or more memory tags 109 (or memory tags 109a-109k), the service platform 103, one or more services 111 (or services 111a-111p) of the service platform 103, one or more content providers 113 (or content providers 113a-113m), etc. By way of example, the one or more memory tags 109 may contain tag information that includes at least one link to one or more content items. The content items may, for instance, be provided by the service platform 103, the one or more services 111, the one or more content providers 113, and/or other services available over the communication network 105. For example, a particular service 111 (e.g., a music or video service) may obtain content (e.g., media content) from a particular content provider 113 to offer the content to the UE 101. Accordingly, the link may be an address or some other identifier that points to a memory or storage location associated with the service platform 103, the services 111, and/or the content providers 113. It is noted that the content items may also be located at the one or more memory tags 109.

By way of example, the communication network 105 of the system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In another embodiment, the content manager 107 may process and/or facilitate a processing of the tag information to determine a record indicating compliance with the at least one protocol for automated content installation. For example, the record may be located in a heading or in metadata associated with the tag information. In this way, the determination of whether such record exists may be quickly assessed. Based on whether such a record exists, the content manager 107 may determine whether the one or more memory tags are compliant with the at least one protocol.

In another embodiment, the content manager 107 may determine that the reading of the tag information by a device is an initial reading. By way of example, the determination that the reading of the tag information by the device is an initial reading may be based on whether the user has previously approved of content items from a provider (e.g., the service platform 103, the services 111, the content providers 113, etc.) associated with the tag information, the one or more memory tags, the one or more content items, etc. Based on the initial reading determination, the content manager 107 may generate a message for requesting an approval from a user of the device to enable the at least one protocol for automated content installation. If the user approves the request, the content manager 107 may then complete the retrieval and/or installation of the one or more content items without further interaction from the user. In this example, a subsequent transaction with the same provider would not require further permission from the user to enable the at least one protocol. In this way, some security measures can be provided to the user to avoid content from untrusted providers with minimal burden, if any, on the user.

In another embodiment, the content manager 107 may determine that the reading of the tag information by a device is not an initial reading. In one scenario, the reading of the tag information by the device may be determined not to be an initial reading, for instance, where the user has previously approved of content items from a provider associated with the tag information, the one or more memory tags, the one or more content items, etc. Based on such a determination, the content manager 107 may enable the at least one protocol for automated content installation. As such, the content manager 107 may then complete the retrieval and/or installation of the one or more content items without further interaction from the user based on the enabling of the at least one protocol.

In another embodiment, the content manager 107 may determine to initiate sharing of the one or more content items and/or the at least one link to the one or more content items from a device to one or more other devices. As mentioned, sharing may be initiated based on detection of the one or more other devices by the device, selection of the one or more devices, selection of the one or more content items, etc. Moreover, the content manager 107 may cause retrieval and/or installation of one or more reward items, for instance, on the device according to at least one reward setting (e.g., defined by the service platform 103, the services 111, the content providers 113, etc.) associated with the one or more content items based on retrieval and/or installation of the one or more content items at the one or more other devices. As discussed, the one or more reward items may include discount information and/or one or more payment credits for an item in an online content store, an item in a section within the online content store, an application within the online content store, an item within the application, one or more physical objects, etc. It is noted that the content manager 107 may also cause retrieval and/or installation of the one or more reward items on the one or more other devices based on the retrieval and/or installation of the one or more content items at the one or more other devices, for instance, to provide users with an incentive to accept shared content from other users and to further encourage the growth of a social network for sharing.

In another embodiment, the content manager 107 may determine that the retrieval and/or installation of the one or more content items by the one or more other devices is an initial retrieval and/or installation. Accordingly, the content manager 107 may thereafter cause the retrieval and/or installation of the one or more reward items based on the determination of the initial retrieval and/or installation. As mentioned, the determination of whether the retrieval and/or installation is an initial retrieval and/or installation may, for instance, be based on whether a user associated with the one or more other devices has previously retrieved and/or installed the one or more content items, or whether the one or more content items was previously retrieved by or installed on the one or more other devices. In this way, users are given an incentive to share as many content items with as many users as they can rather than merely sharing the same content with the same group of users.

In another embodiment, the content manager 107 may validate security information associated with the tag information, the one or more content items, the retrieval of the one or more content items, the installation of the one or more content items, etc. As discussed, to provide a level of security against malicious links and data, the retrieval and/or installation of the one or more content items may be based on the validation of the security information.

By way of example, the UE 101, the service platform 103, the memory tags 109, and the content providers 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
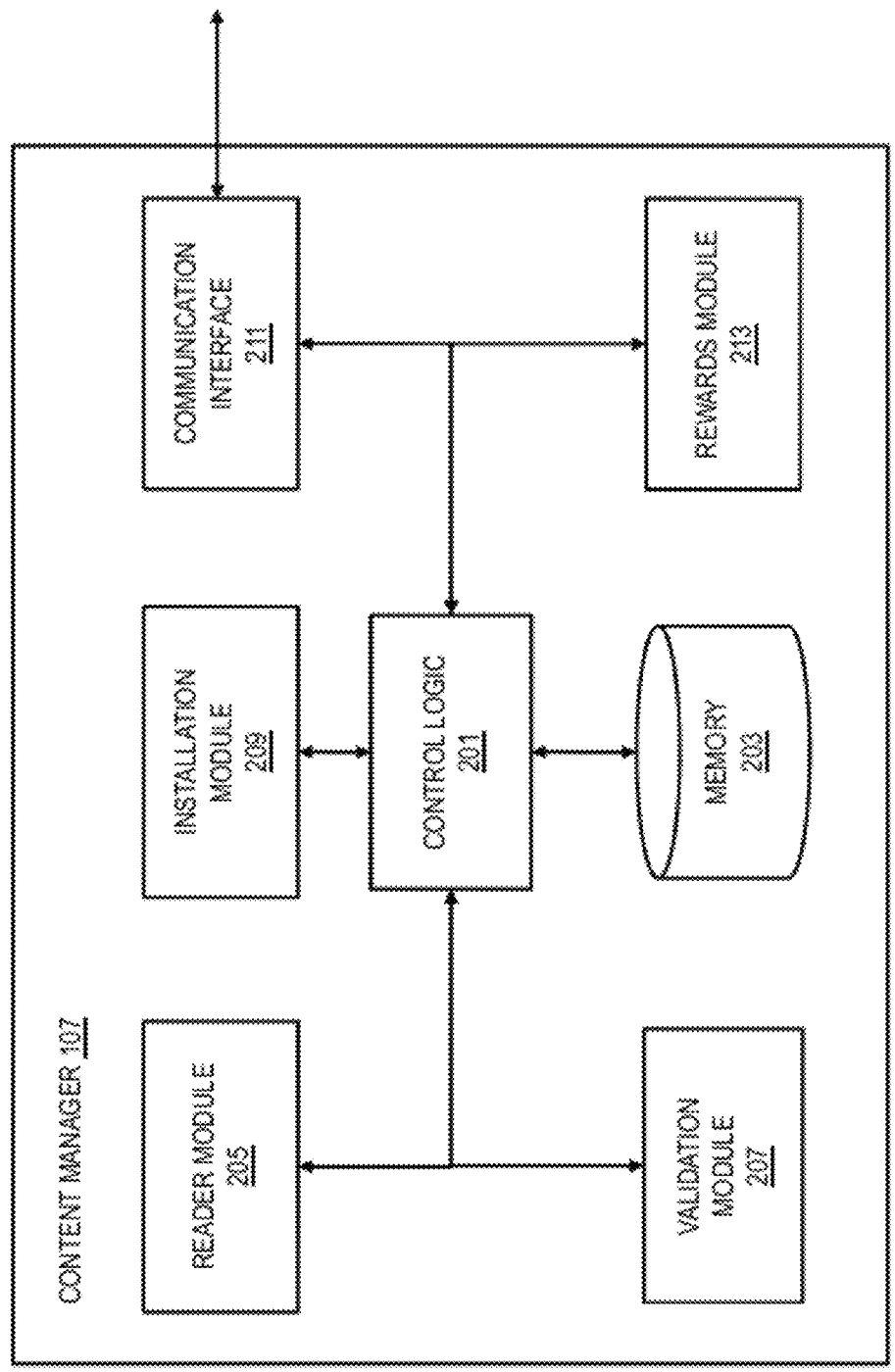
FIG. 2 is a diagram of the components of a content manager, according to one embodiment.

FIG. 2 is a diagram of the components of a content manager, according to one embodiment. By way of example, the content manager 107 includes one or more components for providing tag-based content installation. It is contemplated that the functions of these components may be combined in one or more components or performed by other components of equivalent functionality. In this embodiment, the content manager 107 includes control logic 201, memory 203, a reader module 205, a validation module 207, an installation module 209, a communication interface 211, and a rewards module 213.

The control logic 201 executes at least one algorithm for executing functions of the content manager 107. For example, the control logic 201 may interact with the reader module 205 to read tag information from a memory tag. Moreover, the reader module 205 may also process the tag information to determine a link to a content item.

Next, the control logic 201 may direct the validation module 207 to determine whether the memory tag is in compliance with at least one protocol for automated content installation. To do so, the validation module 207 may process the tag information to determine a record indicating compliance with such protocol. If, for instance, the record exists, the memory tag will be determined to be compliant with the protocol. In addition, the validation module 207 may handle the request for an approval from the user of a device where the reading of the tag information by the device is determined to be an initial reading. Furthermore, the validation module 207 may deal with validating security information associated with the tag information, the content item, the retrieval of the content item, and/or the installation of the content item.

Then, the control logic 201 may work with the installation module 209 to retrieve and/or install the content item. By way of example, the installation module 209 may analyze one or more criteria associated with the content item, the retrieval of the content item, and/or the installation of the content item, such as a cost criterion, a resource usage criterion, or any other criterion, to determine whether to retrieve and/or install the content item without further interaction from the user or to request actions from the user prior to retrieving and/or installing the content item.

The control logic 201 may also utilize the communication interface 211 to communicate with other components of the content manager 107, the UEs 101, the service platform 103, the memory tags 109, the content providers 113, and other components of the system 100. The communication interface 211 may include multiple means of communication. For example, the communication interface 211 may be able to communicate over SMS, internet protocol, instant messaging, voice sessions (e.g., via a phone network), or other types of communication.

The control logic 201 may further employ the rewards module 213 to detect sharing of a content item. The rewards module 213 may also submit requests for a reward item, for instance, to the service platform 103 (e.g., via the communication interface 211) according to a reward setting associated with the content item after determining that sharing has been completed (e.g., retrieval and/or installation of the content item at the other device). Once the reward request has been approved (e.g., by the service platform 103), the rewards module 213 may operate in conjunction with the installation module 209 to retrieve and/or install the reward item. In one embodiment, the reward item can be retrieved and/or installed by the UE 101 sharing the content item and/or the UE 101 receiving and/or installing the shared content item.

Figure 3:
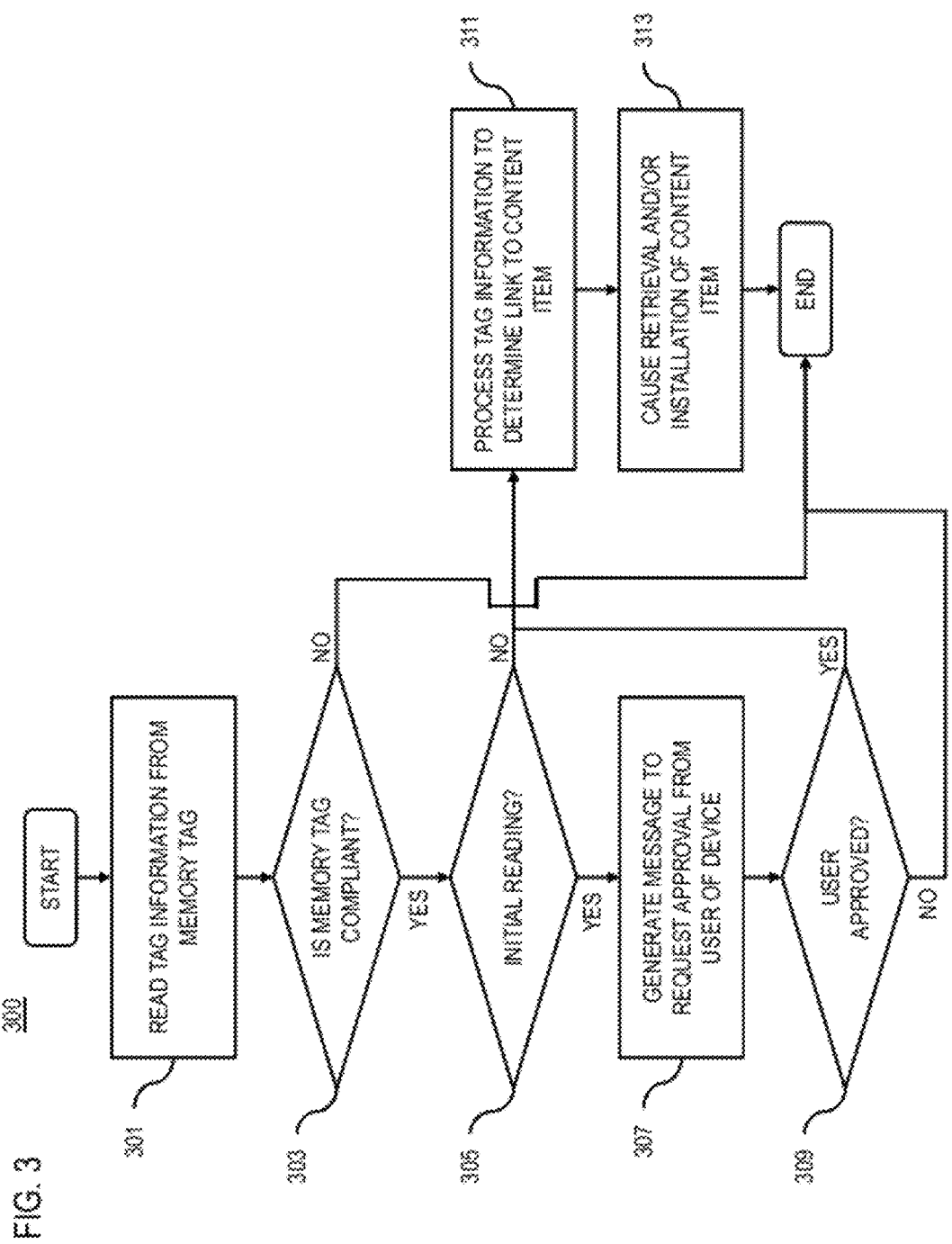
FIG. 3 is a flowchart of a process for providing tag-based content installation, according to one embodiment.
Figure 9:
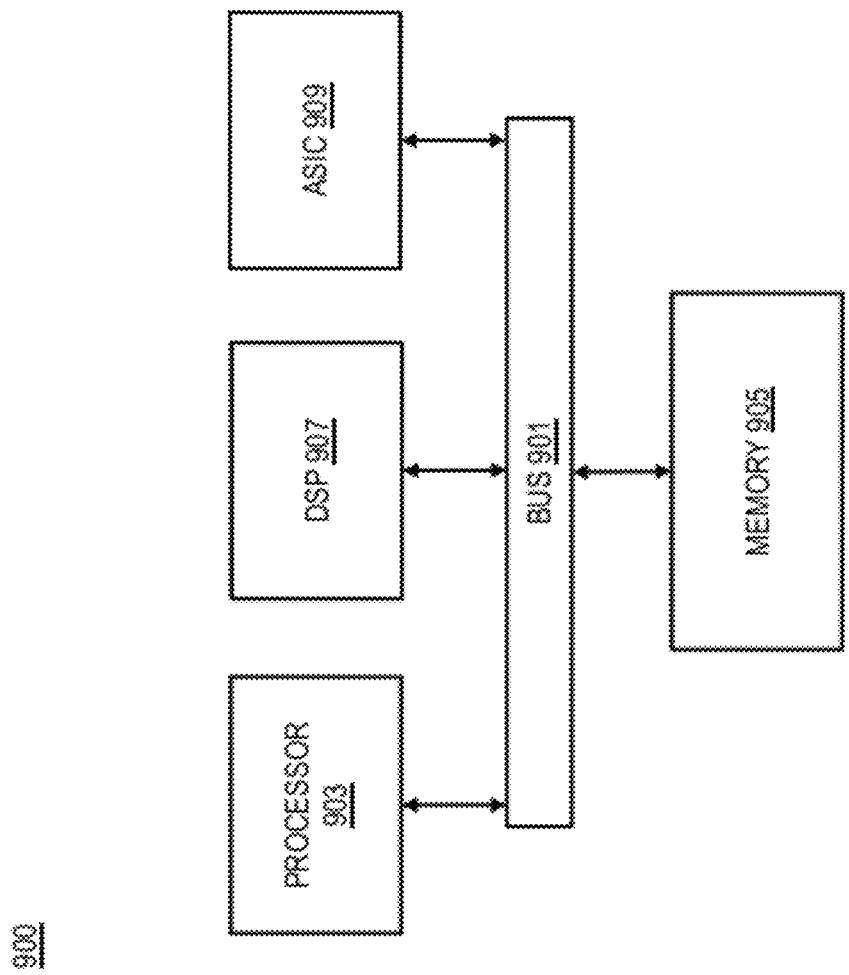
FIG. 9 is a diagram of a chip set that can be used to implement an embodiment of the invention.

FIG. 3 is a flowchart of a process for providing tag-based content installation, according to one embodiment. In one embodiment, the control logic 201 and/or other components of the content manager 107 performs the process 300 and is implemented in, for instance, a chip set including a processor and a memory as shown in FIG. 9. As such, the control logic 201 can provide means for accomplishing various parts of the process 300 as well as means for accomplishing other processes in conjunction with other components of the content manager 107.

In step 301, the control logic 201 may cause reading of tag information from one or more memory tags. The control logic 201 may check, as in step 303, whether the one or more memory tags are compliant with at least one protocol for automated content installation, for instance, by processing and/or facilitating a processing of the tag information to determine a record indicating compliance with the at least one protocol. As discussed, such a record may be located in a heading or metadata associated with the tag information so that the existence of the record may be quickly assessed.

If the record is determined, the control logic 201 may, as in step 305, determine whether the reading of the tag information by a device is an initial reading. As previously mentioned, whether the reading is an initial reading may, for instance, be based on whether the user has previously approved of content items from a provider (e.g., the service platform 103, the services 111, the content providers 113, etc.) associated with the tag information, the one or more memory tags, the one or more content items, etc.

If it is determined that the reading is an initial reading, the control logic 201 may, as in step 307, determine to generate a message for requesting an approval from user of the device to enable the at least one protocol. By way of example, the approval request may be presented to the user in the form of a prompt requiring a selection by the user (e.g., approve, deny, etc.). The control logic 201 may, as in step 309, determine whether the user has given approval. As demonstrated by steps 309, 311, and 313, an approval from the user may enable the retrieval and/or installation of the one or more content items to be completed without further interaction from the user. Upon user approval, for instance, the control logic 201 may, as in step 311, process and/or facilitate a processing of the tag information to determine at least one link to the one or more content items. Thereafter, in step 313, the control logic 201 may cause retrieval and/or installation of the one or more content items according to the at least one protocol.

Other the other hand, if the reading of the tag information by the device is determined, in step 305, not to be an initial reading, the user approval would not be required to enable the at least one protocol for automated content installation. Thus, as demonstrated in steps 305, 311, and 313, the one or more content items may be retrieved and/or installed, for instance, on the device without any prompts.

Figure 4:
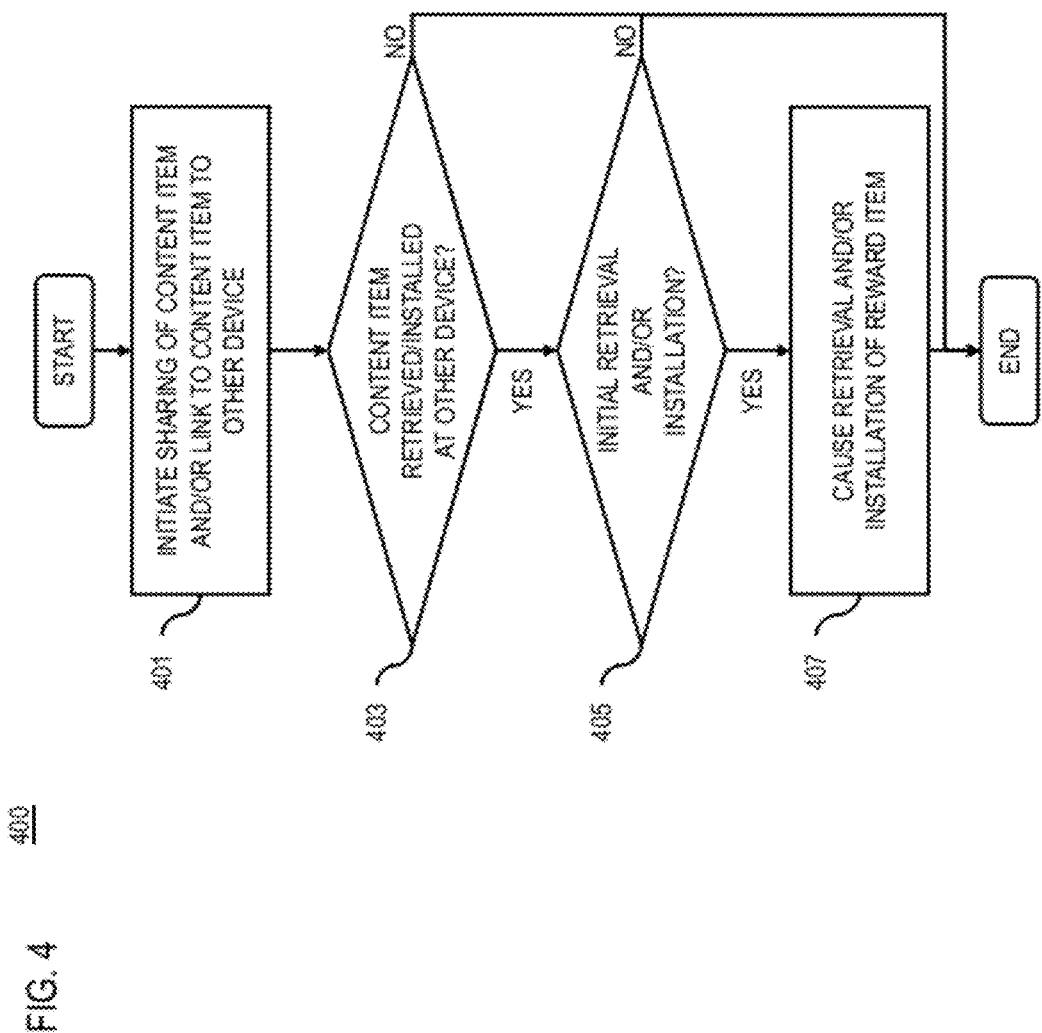
FIG. 4 is a flowchart of a process for providing incentives for sharing content items, according to one embodiment.

FIG. 4 is a flowchart of a process for providing incentives for sharing content items, according to one embodiment. In one embodiment, the control logic 201 and/or other components of the content manager 107 performs the process 400 and is implemented in, for instance, a chip set including a processor and a memory as shown in FIG. 9. As such, the control logic 201 can provide means for accomplishing various parts of the process 400 as well as means for accomplishing other processes in conjunction with other components of the content manager 107.

In step 401, the control logic 201 may initiate sharing of the one or more content items and/or the at least one link to the one or more content items from a device to one or more other devices. As provided, the device and the one or more other devices may utilize NFC or other short-range technologies to detect and communicate with each other. For example, the device may transmit the at least one link to the one or more devices using NFC technology. Also, as mentioned, sharing may be initiated based on detection of the one or more other devices by the device, selection of the one or more devices, selection of the one or more content items, etc.

In step 403, the control logic 201 may determine whether the one or more content items has been retrieved and/or installed at the one or more other devices. If the one or more content items has been retrieved and/or installed, the control logic 201 may, as in step 405, determine whether the retrieval and/or installation of the one or more content items by the one or more other devices is an initial retrieval and/or installation. As explained, limiting reward items to an initial retrieval and/or installation may encourage users to share their content items to new and different users.

If it is determined that the retrieval and/installation at the one or more other devices is an initial retrieval and/or installation, the control logic 201 may, as in step 407, cause retrieval and/or installation of one or more reward items according to at least one reward setting (e.g., defined by the service platform 103, the services 111, the content providers 113, etc.) associated with the one or more content items. As previously discussed, the one or more rewards items may, for instance, be retrieved and/or installed at the device or at the one or more other devices.

Figure 5:
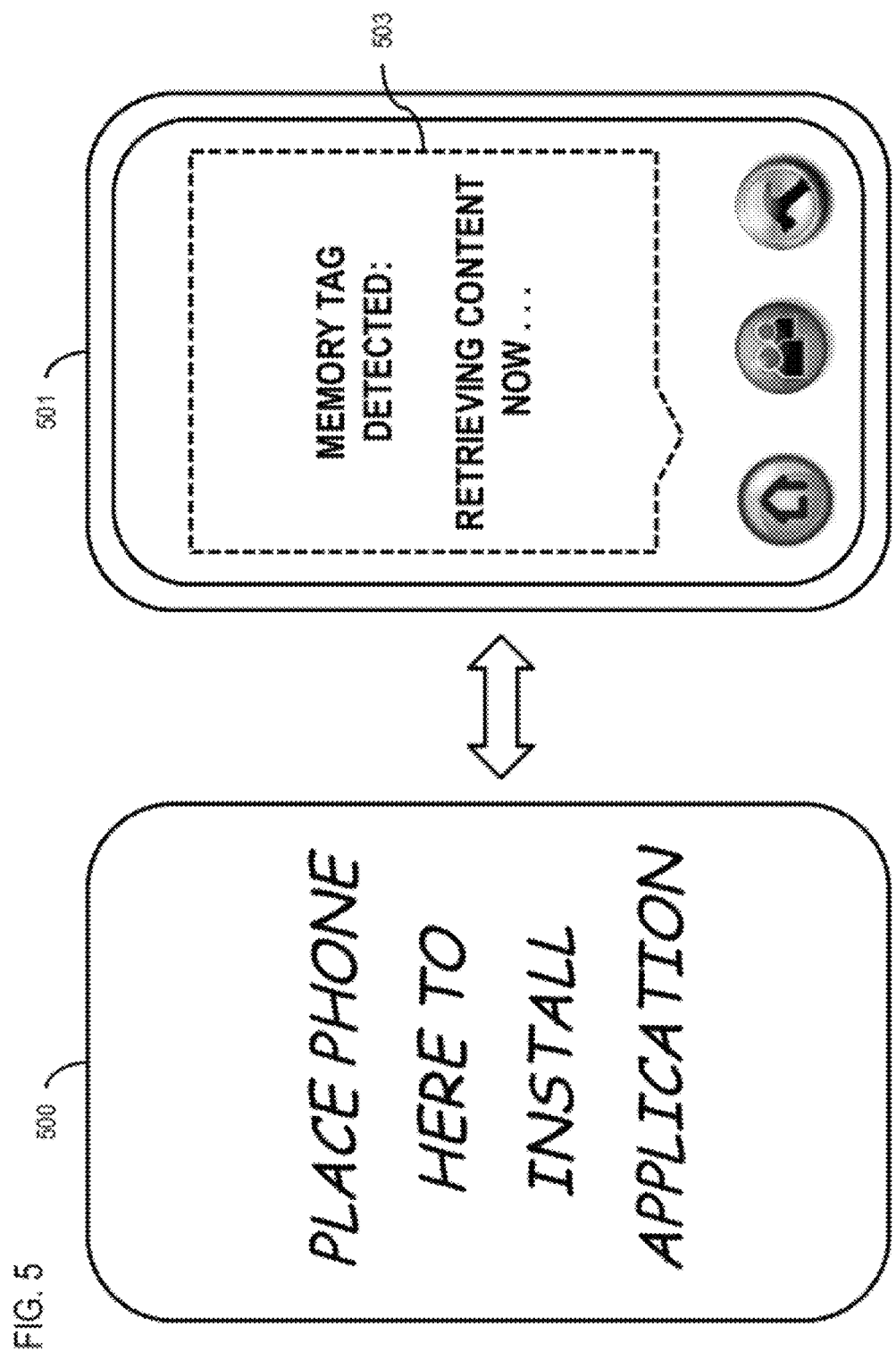
FIG. 5 is a diagram of an implementation of providing tag-based content installation, according to one embodiment.

FIG. 5 is a diagram of an implementation of providing tag-based content installation, according to one embodiment. FIG. 5 illustrates a memory tag 500, a mobile phone 501, and a notification 503. As shown, the memory tag 500 includes an instruction to place the mobile phone on the memory tag 500 to install an application associated with the memory tag 500. In this example, the mobile phone 501 may be utilizing NFC or other short-range technologies to detect and communicate with the memory tag 500. Thus, when the mobile phone 501 was placed on (or near) the memory tag 500, the mobile phone 501 automatically detected the memory tag 500 and began retrieving the application. As demonstrated, other than placing the mobile phone 501 on (or near) the memory tag 500, no further user action was required to retrieve the application for installation on the mobile phone 501. Here, the mobile phone 501 nonetheless presents the user with the notification 503 to inform the user of the actions currently being taken.

FIGS. 6A and 6B are diagrams of user interfaces utilized in the processes of FIG. 3, according to various embodiments. FIG. 6A illustrates a user interface 600 that features a notification 601 and buttons 603 and 605. As indicated, it was determined that the reading of the tag information was an initial reading. In this example, the notification 601 demonstrates that the determination that the reading of the tag information was an initial reading was based on the fact that the user had not previously received content items from the particular provider (e.g., Provider X). As such, the user is presented with the notification 601, which offers the buttons 603 and 605 for the user to choose from (e.g., "Trust Provider X", "Do Not Trust"). FIG. 6B illustrates a user interface 630 that features a notification 631. As indicated, the user had selected the button 603 (e.g., "Trust Provider X") from FIG. 6A. Accordingly, as demonstrated by the notification 631, Provider X is now a trusted provider and the content item is retrieved without further interaction from the user.

Figure 7B:
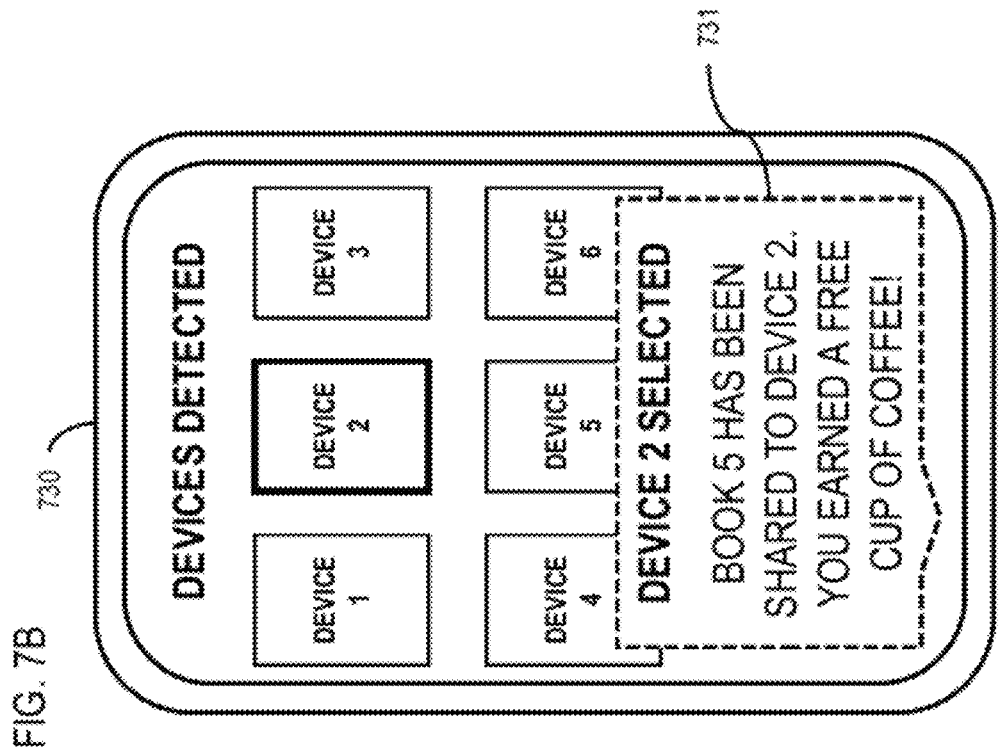
FIGS. 7A and 7B are diagrams of user interfaces utilized in the processes of FIG. 4, according to various embodiments.
Figure 7A:
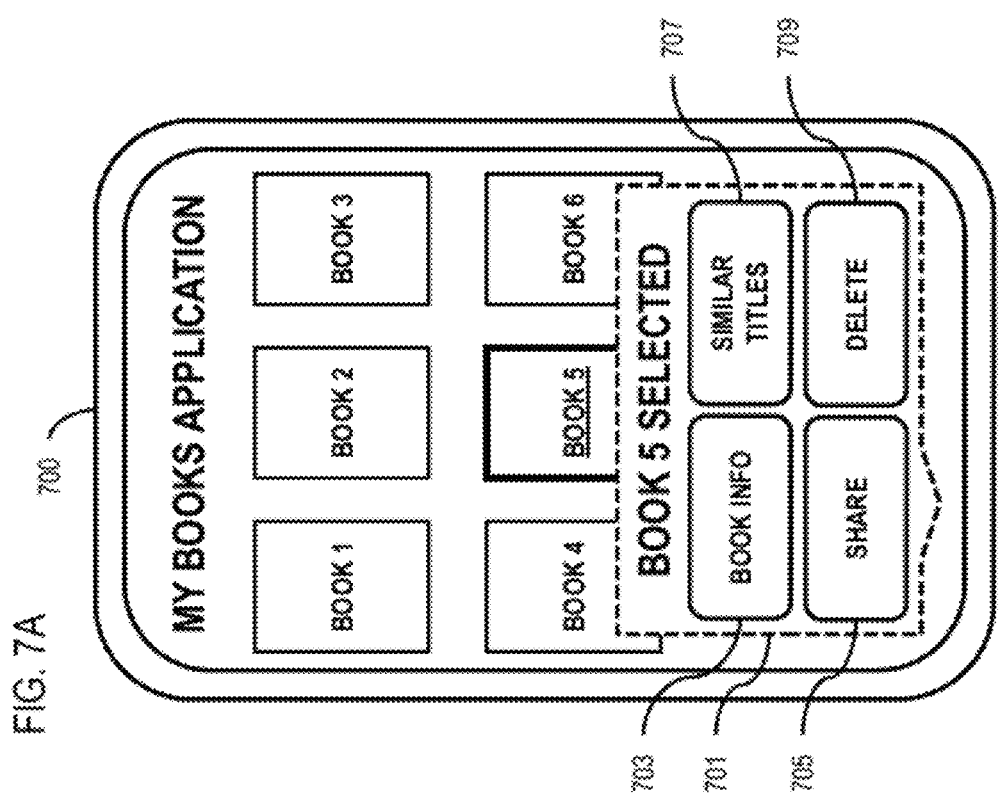

FIGS. 7A and 7B are diagrams of user interfaces utilized in the processes of FIG. 4, according to various embodiments. FIG. 7A illustrates a user interface 700 that features a collection of e-books within an e-books application, a notification 701, and buttons 703, 705, 707, and 709. As shown, the user has selected book 5 (e.g., by tapping the icon, by pressing and holding the icon for a period of time, etc.). As a result, the notification 701 is presented to the user to indicate that book 5 has been selected and to offer the buttons 703, 705, 707, and 709 (e.g., "Book Info", "Share", "Similar Titles", "Delete") as options for the user to choose from. FIG. 7B illustrates a user interface 730 that features a display of detected devices and a notification 731. As indicated, the user had selected the button 705 (e.g., "Share") from FIG. 7A. Moreover, as provided by the notification 731, the user had decided to share book 5 with device 2 and the sharing was completed (e.g., retrieval of book 5 on device 2). As a result, the user was rewarded with a free cup of coffee.

The processes described herein for providing tag-based content installation may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
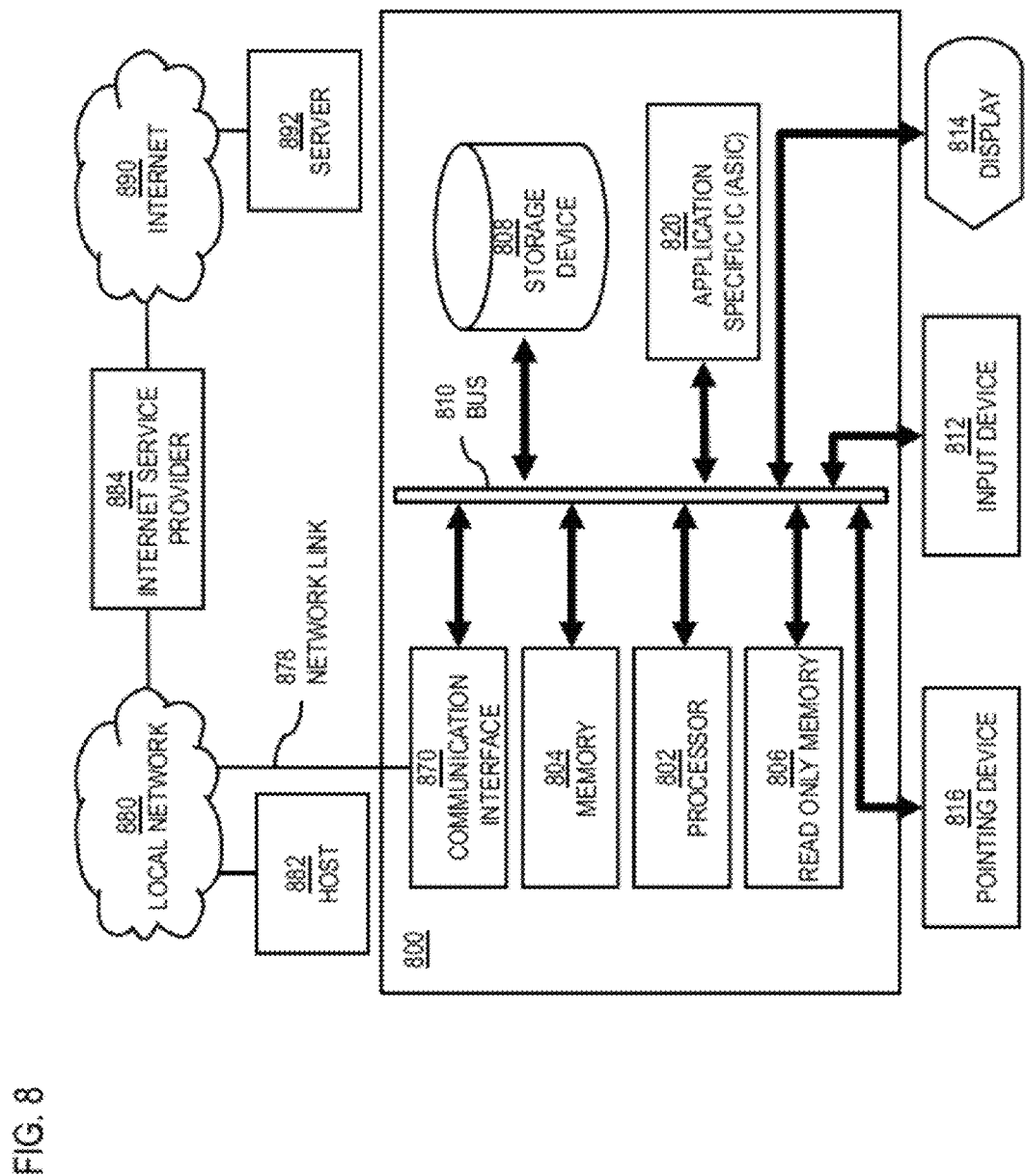
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide tag-based content installation as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing tag-based content installation.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to provide tag-based content installation. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for providing tag-based content installation. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing tag-based content installation, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for providing tag-based content installation to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide tag-based content installation as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing tag-based content installation.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide tag-based content installation. The memory 905 also stores the data associated with or generated by the execution of the inventive steps.

Figure 10:
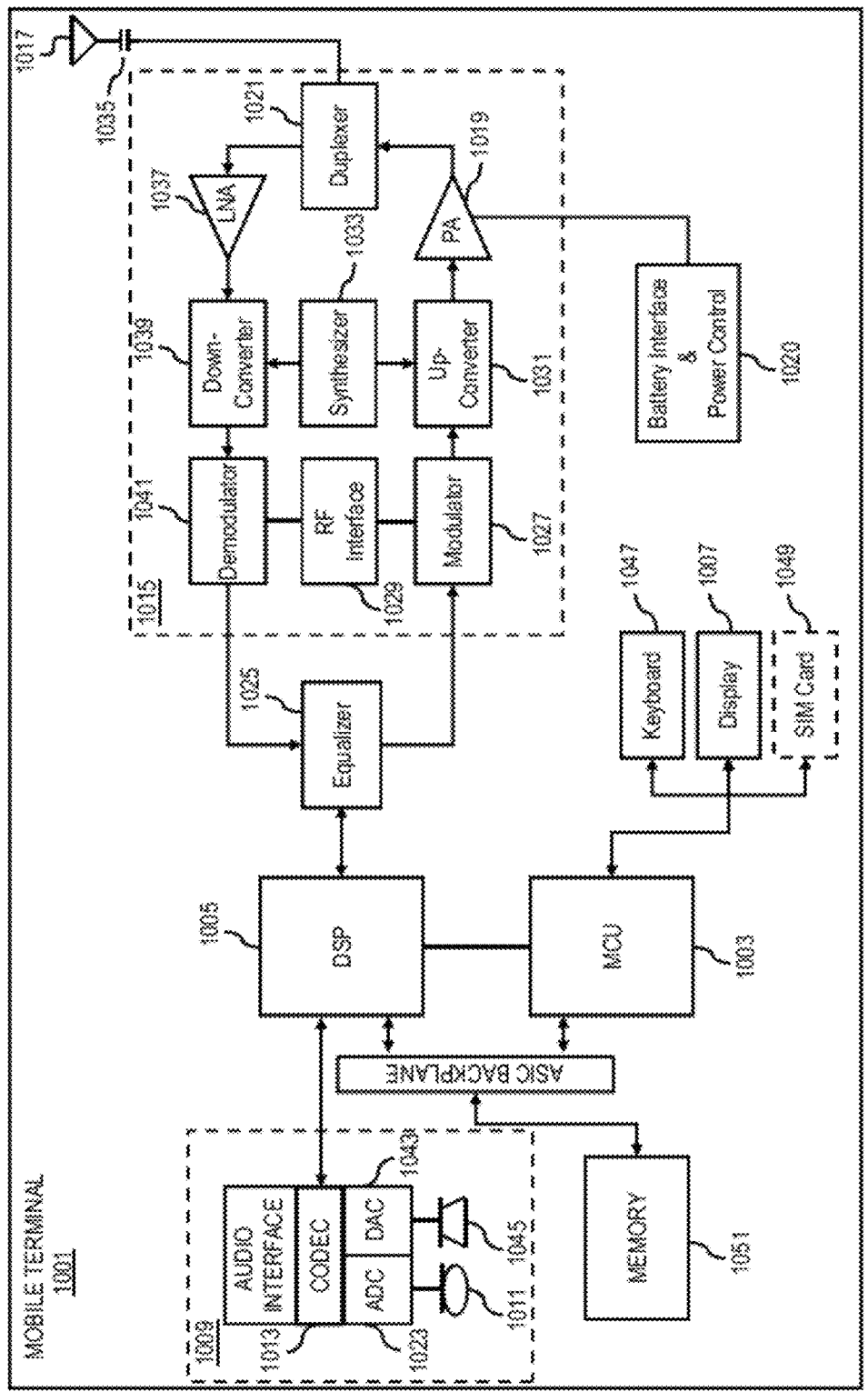
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of providing tag-based content installation. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing tag-based content installation. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide tag-based content installation. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   detecting, by a mobile device, one or more memory tags with a near field communication mechanism;
   reading, by the mobile device without intervention by a user of the mobile device, tag information from the one or more memory tags;
   determining, by the mobile device, that the reading of the tag information is an initial reading;
   presenting, on a user interface of the mobile device, a message for requesting an approval from the user to enable at least one protocol for automated content installation;
   processing, by the mobile device without intervention by the user, the tag information to validate that the one or more memory tags are compliant with the at least one protocol, wherein the automated content installation occurs based on the enabling of the at least one protocol;

processing, by the mobile device without intervention by the user, the tag information to determine at least one web link to one or more content items stored at a server after the validation;

retrieving, via a network by the mobile device without intervention by the user, the one or more content items using the web link contingent on one or more criteria preset by the user for desired content items, wherein the one or more content items include one or more media content items and one or more applications for processing the one or more media content items, and the one or more criteria include at least one cost criterion for the one or more content items;

installing, by the mobile device without user intervention, the one or more applications according to the at least one protocol on the mobile device; and receiving, via the network by the mobile device, one or more reward items provided to the user for the installation.

2. A method of claim 1, further comprising:
processing the tag information to determine a record indicating compliance with the at least one protocol;
determining that the one or more memory tags are compliant with the at least one protocol based, at least in part, on the record,
wherein the record is based, at least in part, on a heading or metadata associated with the tag information, and
wherein the at least one cost criterion includes a price for retrieving the one or more content items.

3. A method of claim 1, further comprising:
wherein the installation of the one or more content items is completed without further interaction from the user based, at least in part, on the approval.

4. A method of claim 1, further comprising:
determining that the reading of the tag information by the mobile device is not an initial reading; and
enabling the at least one protocol for automated content installation,
wherein the installation of the one or more content items is completed without further interaction from the user based, at least in part, on the enabling of the at least one protocol.

5. A method of claim 1, wherein the one or more criteria associated with the one or more desired content items further include one or more resource usage criteria that include one or more bandwidth requirements, one or more storage requirements, one or more processing requirements, or a combination thereof.

6. A method of claim 1, wherein the one or more content items include, at least in part, information in an online content store, a section within the online content store, an item within the online content store, an application within the online content store, an item within the application, information associated with one or more physical objects, an item in a content storage, or a combination thereof.

7. A method of claim 1, further comprising:
sharing the one or more content items, the web link to the one or more content items, or a combination thereof from the mobile device to one or more other devices; and
initiating an installation of the one or more reward items according to at least one reward setting associated with the one or more content items at the mobile device, the one or more other devices, or a combination thereof based, at least in part, on installation of the one or more content items at the one or more other devices.

8. A method of claim 7, further comprising:
determining that the installation of the one or more content items by the one or more other devices is an initial installation;
wherein the retrieval and/or installation of the one or more reward items is based, at least in part, on the determination of the initial installation.

9. A method of claim 7, wherein the one or more reward items are received separately from the one or more content items via the network by the mobile device, and wherein the one or more reward items include, at least in part, discount information, one or more payment credits, or a combination thereof for an item in an online content store, an item in a section within the online content store, an application within the online content store, an item within the application, one or more physical objects, an item in a content storage, or a combination thereof.

10. A method of claim 7, wherein the sharing of the one or more content items, the web link to the one or more content items, or a combination thereof is initiated based, at least in part, on detection of the one or more other devices by the device via one or more short-range wireless communication mechanisms.

11. A method of claim 1, further comprising:
validating security information associated with the tag information, the one or more content items, the installation of the one or more content items, or a combination thereof,
wherein the installation of the one or more content items is based, at least in part, on the validation of the security information.

12. An apparatus comprising:
at least one processor; and
at least one memory including computer program code for one or more programs,
the at least one memory and the computer program code configured to, with the at least one processor, cause the apparatus embedded in a mobile device to perform at least the following,
detect one or more memory tags with a near field communication mechanism;
read, without intervention by a user of the mobile device, tag information from the one or more memory tags;
determine that the reading of the tag information is an initial reading;
present, on a user interface of the mobile device, a message for requesting an approval from the user to enable at least one protocol for automated content installation;
process, without intervention by the user, the tag information to validate that the one or more memory tags are compliant with the at least one protocol, wherein the automated content installation occurs based on the enabling of the at least one protocol;
process, without intervention by the user, the tag information to determine at least one web link to one or more content items stored at a server after the validation;
retrieve, via a network without intervention by the user, the one or more content items using the web link contingent on one or more criteria preset by the user for desired content items, wherein the one or more content items include one or more media content items and one or more applications for processing the one or more media content items, and the one or more criteria include at least one cost criterion for the one or more content items;

install, without user intervention, the one or more applications according to the at least one protocol on the mobile device; and receive, via the network, one or more reward items provided to the user for the installation.

13. An apparatus of claim 12, wherein the apparatus is further caused to:

process the tag information to determine a record indicating compliance with the at least one protocol; and determine that the one or more memory tags are compliant with the at least one protocol based, at least in part, on the record, wherein the record is based, at least in part, on a heading or metadata associated with the tag information.

14. An apparatus of claim 12, wherein the installation of the one or more content items is completed without further interaction from the user based, at least in part, on the approval.

15. An apparatus of claim 12, wherein the apparatus is further caused to:

determine that the reading of the tag information by the mobile device is not an initial reading; and enable the at least one protocol for automated content installation, wherein the installation of the one or more content items is completed without further interaction from the user based, at least in part, on the enabling of the at least one protocol.

16. An apparatus of claim 12, wherein the one or more criteria associated with the one or more desired content items further include one or more resource usage criteria that include one or more bandwidth requirements, one or more storage requirements, one or more processing requirements, or a combination thereof.

17. An apparatus of claim 12, wherein the one or more content items include, at least in part, information in an online content store, a section within the online content store, an item within the online content store, an application within the online content store, an item within the application, information associated with one or more physical objects, an item in a content storage, or a combination thereof.

18. An apparatus of claim 12, wherein the apparatus is further caused to:

share the one or more content items, the web link to the one or more content items, or a combination thereof from the mobile device to one or more other devices; and initiate an installation of the one or more reward items according to at least one reward setting associated with the one or more content items at the mobile device, the one or more other devices, or a combination thereof based, at least in part, on installation of the one or more content items at the one or more other devices.

19. An apparatus of claim 18, wherein the apparatus is further caused to:

determine that the installation of the one or more content items by the one or more other devices is an initial installation;

wherein the installation of the one or more reward items is based, at least in part, on the determination of the initial installation.

20. An apparatus of claim 18, wherein the one or more reward items include, at least in part, discount information, one or more payment credits, or a combination thereof for an item in an online content store, an item in a section within the online content store, an application within the online content store, an item within the application, one or more physical objects, an item in a content storage, or a combination thereof.

* * * * *